May 3, 1949. W. W. SMALL 2,469,183
PANEL MOUNTING
Filed Aug. 22, 1945
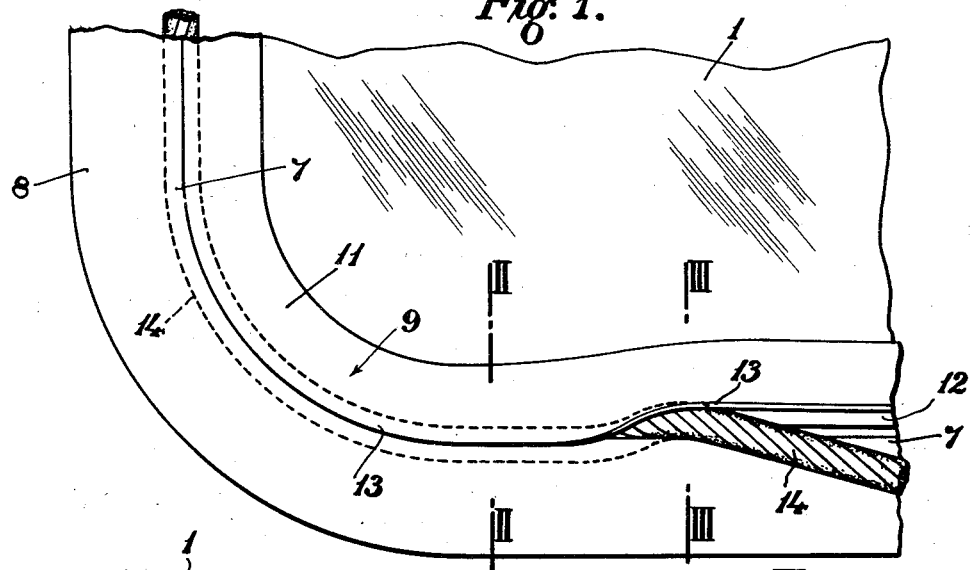
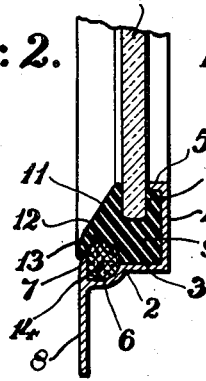
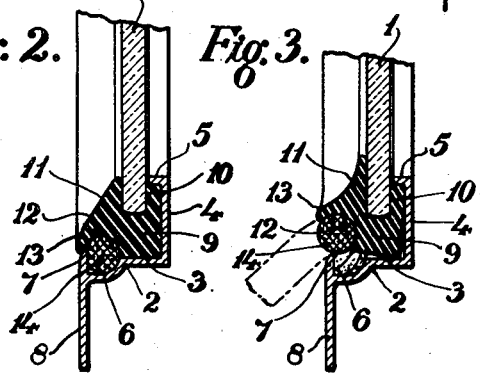
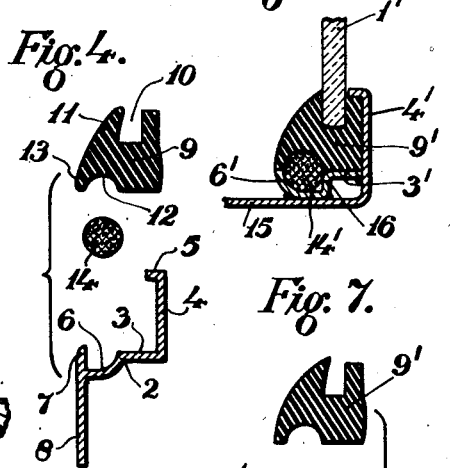
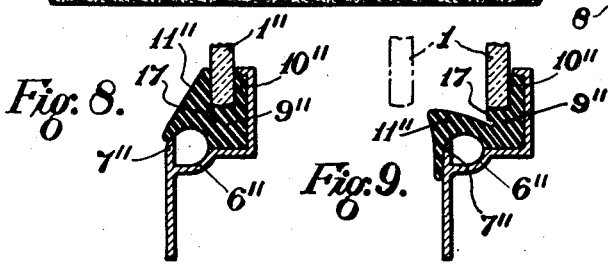
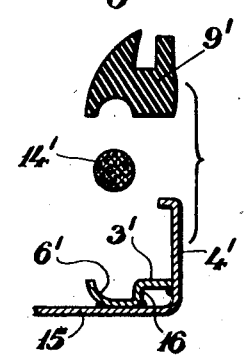
INVENTOR
Walter William Small
BY Richard y Geier
ATTORNEYS Patented May 3, 1949

2,469,183

UNITED STATES PATENT OFFICE 2,469,183

PANEL MOUNTING

Walter William Small, Birmingham, England, assignor to Auster Limited, Birmingham, England, a company of Great Britain Application August 22, 1945, Serial No. 611,989
In Great Britain December 12, 1944

6 Claims. (Cl. 20—56.4)

This invention relates to means for glazing or mounting windows and like panels within their frames, said means being of the kind comprising a rubber or like resilient strip, having a channel for receiving the glass or other panel, and adapted to be removably supported upon or engaged with a seating surface of the frame, being retained in place by a separate strip-like member co-operating with the rubber or like channelled strip and with the frame.

An object of the present invention is to provide an improved and simplified panel glazing or mounting means which will firmly hold the panel in position but which admits of the panel being quickly and easily removed and replaced when required.

A further object is to ensure the separate retaining member being consealed from view when the panel is mounted and secured in the frame, thus giving a neat finish and affording no indication of the location of the securing means, thereby serving to deter attempts at unauthorized removal.

According to the invention, a panel glazing or mounting means comprises a frame having a groove or longitudinal recess therein, in combination with a panel-receiving channelled rubber or like resilient strip supported upon or engaged with a seating surface of the frame, and a separate strip-like retaining member engaging the groove or recess of the frame and also engaging a longitudinal groove in the underside of the channelled rubber or like strip so as to maintain the outer wall of the said channelled strip firmly pressed against the face of the panel.

The invention also consists of a panel glazing or mounting means comprising a frame having a groove or longitudinal recess therein, in combination with a panel-receiving channelled rubber or like resilient strip supported upon or engaged with a seating surface of the frame, and a separate strip-like retaining member engaging the groove or recess in the frame and also engaging a longitudinal groove in the channelled rubber or like strip; the said longitudinal groove in the channelled rubber or like strip forming an outer flexible resilient flap on the strip which, when the retaining member is in position, substantially conceals said member, but which is adapted to be raised to give access to the retaining member for removal thereof.

Figure 1 of the accompanying drawings is a fragmentary elevation of one corner of a vehicle window in which the glass pane is mounted in accordance with the present invention. This view shows the retaining strip in course of being fitted or removed.

Figure 2 is a vertical cross-section on line II—II, Figure 1.

Figure 3 is a cross-section on line III—III, Figure 1, showing how the retaining strip is inserted or removed.

Figure 4 shows, in cross-section, the glazing strip, retaining member and the frame, separated from one another, and without the window pane.

Figure 5 is an elevation of a portion of the retaining strip.

Figure 6 is a cross-section through a modified form of panel mounting.

Figure 7 shows the component parts of this modification separated from one another.

Figure 8 is a cross-section through another modification.

Figure 9 shows how the outer portion of the glazing strip of this modification may be folded down to enable the glass pane to be inserted or removed.

Referring to Figures 1 to 5 of the said drawings, the metal frame or surround within which the glass window pane 1 is mounted, is of rectangular or other desired shape for fitting in the window aperture of a vehicle body, and may have rounded corners, one of which is shown in Figure 1. The said frame or surround has a cross-sectional shape as represented in Figures 2 to 4, and comprises a base portion 2 having a horizontal seating surface 3. Integral with said base portion at one side of the surface 3 is a rear upstanding wall 4 extending into the window aperture and having its outer edge turned over to form a lip or flange 5 which overhangs the base portion; and at the outer or front side of the seating surface 3 a continuous longitudinal groove 6 is formed in the base portion all round the frame, thus providing an upstanding outer lip 7 the top edge of which is level with the surface 3. This lip 7 may, as shown, be continuous and flush with a depending flange portion 8.

The glass pane 1 is mounted within the frame by means of a rubber or like resilient glazing strip 9 having a longitudinal groove or channel 10 to receive the edge of the glass, and being of substantial thickness below this groove. The rear wall of this glazing strip is substantially vertical to correspond to the vertical rear wall 4 of the frame, but the outer portion 11 of the strip is of a rounded or sloping buttress section, increasing in thickness from a V-shaped upper edge which contacts the glass to a wide base portion. The rear portion of the underside of the said rubber strip 9, beneath the glass-receiving channel 10 thereof, is horizontal, being designed to be supported upon the seating surface 3 of the frame, with the upper edge of the rear wall of the channel engaging beneath the overhanging lip 5 on the rear wall 4 of the frame; but the underside of the outer or buttress portion 11 of the rubber strip is formed with a longitudinal semi-circular groove 12 adapted to come immediately above and to be opposed to the groove 6 in the frame when the window is mounted in the frame. The said groove 12 in the underside of the rubber strip is near the outer edge of the latter and thus forms a thin flexible resilient flap 13 the edge of which is level with the rear portion of the strip and which is adapted, when the window is in position, to engage the upwardly-presented edge of the frame lip 7, with the outer surface of the buttress portion 11 of the rubber strip flush or nearly flush with the outer face of the frame.

The channelled rubber glazing strip 9 is applied to the edge of the glass 1 before the latter is mounted in the frame, and the glass with the attached strip is inserted into the window frame so that the strip seats closely upon the seating surface 3 of the frame, with its rear wall engaging closely beneath the top lip 5 on the frame. The groove 12 in the underside of the rubber strip is thus opposed to the groove 6 in the frame, forming a closed passage or tunnel, and the outer buttress surface of the strip is substantially flush with the frame, the edge of the flexible outer flap 13 of the rubber strip being opposed to and engaging the edge of the frame lip 7. The glazing strip 9 is secured in position in the frame by means of a separate strip-like retaining or locking member 14 which is introduced between the said glazing strip and the frame so as to engage partly in the groove 12 in the glazing strip and partly in the opposed groove 6 in the frame. This separate retaining or locking member 14 may, as shown, consist of a circular-sectioned length of fibrous cord, but it could be a length of cane, wood, felt, metal or other suitable material, either solid or tubular, or a length of spirally-coiled spring wire. It is inserted into engagement with the grooves 6, 12, by lifting up the flexible outer flap 13 of the glazing strip and forcing it into position by a suitable tool, as illustrated in Figures 1 and 3. The retaining member 14 thus keys the glazing strip 9 to the frame, and its size is such that it exerts an upward pressure on the offset buttress portion 11 of the glazing strip, tending to cause the outer wall of the rubber channel 10 to press laterally against the face of the glass 1 so as to hold the latter firmly in position and form a waterproof joint.

When the retaining member 14 is in position there may or may not be a slight gap between the edge of the outer flexible flap 13 of the glazing strip and the opposed edge 7 of the frame, but in any case the retaining member is wholly or substantially concealed from view, thereby giving a neat finish and affording no indication of the existence or location of the retaining member, thus serving to deter attempts at unauthorised removal. By lifting the outer flap 13, the retaining member 14 may be removed and the window with glazing strip removed from the frame.

The construction of the frame may be considerably varied so long as it has a longitudinal groove for receiving the retaining member. Thus, as illustrated in Figures 6 and 7, the frame may be in two parts, namely, an angle-sectioned main portion having an upstanding wall $4^1$ and a horizontal portion 15 (which may be of any width and may be a window pan or an extension of the body panelling); and a seating strip 16 welded or otherwise fixed upon the horizontal portion 15. This seating strip 16 has an elevated seating surface $3^1$ adjacent the wall 4, and a groove $6^1$ in its outer portion. The rubber glazing strip $9^1$ after being fitted to the glass pane $1^1$, is seated upon the surface $3^1$ and is held thereon by the retaining strip $14^1$.

In the modified form of the invention shown in Figures 8 and 9, the construction is substantially the same as in Figures 1 to 5, but the lower portion of the glazing strip $9^{11}$ is slit downwards at 17 for a suitable distance downwards from the bottom of the glass-receiving channel $10^{11}$, at the outer side thereof, so that the whole of the outer portion $11^{11}$, including the outer wall of the channel, may be turned angularly downwards over the edge of the frame lip $7^{11}$, as shown in Figure 9, after the retaining member has been removed, so that the glass $1^{11}$ can be withdrawn from the strip $9^{11}$ while the latter remains in place in the frame $6^{11}$. Likewise, in mounting the window, the glazing strip may first be placed in position in the frame and then the glass introduced after folding down the outer wall of the glazing strip as above described (Figure 9), the said wall springing back into place and being then secured by inserting the retaining member.

If a resilient or compressible retaining member is employed, such as cord or felt or a coiled spring, it exerts an expansile upward force on the buttress portion of the glazing strip, tending to take up any looseness that might otherwise be caused due to shrinkage of the glazing-strip material.

I claim:

1. A panel assembly comprising a panel, a frame having a base surface surrounding said panel, said frame having an upstanding wall on one side of said base surface and a continuous longitudinal groove intermediate the ends thereof and extending below the same, a flexible, one-piece glazing strip mounted upon said base surface adjacent said upstanding wall and having a base portion extending over said groove, said strip having in its upper face a continuous channel receiving the edge of said panel and in the underside of its base portion a continuous groove opposed to and adjacent said first mentioned groove, said opposed grooves being outwardly offset from and below said channel and forming an enclosed space, and a flexible longitudinal retaining member removably located in said opposed grooves to key said glazing strip to said frame and adapted to cause a side wall of said channel to be pressed laterally against said panel.

2. A panel mounting comprising a frame having a base surface and adapted to surround a panel, said frame having an upstanding wall at one side of said surface and a continuous longitudinal groove intermediate the ends thereof, a one-piece flexible channelled glazing strip adapted to receive the edge of the panel within its channel and having a base portion, said base portion having a continuous longitudinal groove in the underside thereof below and outwardly offset from said channel forming a flexible outer flap portion, said glazing strip being mounted within said frame adjacent said wall with its groove opposed to and in superposed relation to the groove in said frame, whereby said grooves are enclosed by their walls, said flap portion engaging said frame outside the groove therein, and a longitudinal flexible retaining member seated in said grooves keying said glazing strip to said frame and adapted to cause a side wall of the panel receiving channel to be pressed laterally inwards.

3. A window assembly comprising a window panel, a frame having a base surface and surrounding said panel, an upstanding wall at one side of said base surface and a continuous longitudinal groove at the other side thereof formed in said frame intermediate its ends, a one-piece rubber glazing strip mounted in said frame adjacent said wall and having a continuous channel receiving the edge of said panel and having a base portion, said base portion having a continuous groove formed in the underside thereof outwardly offset from said channel and opposed to and in superposed relation with said groove in said frame, whereby said grooves are enclosed by their walls, and a flexible longitudinal member removably engaged in said grooves keying said glazing strip to said frame and compressing said strip whereby a wall of said channel is pressed laterally against said panel, the outer side of the glazing strip remote from the wall of said frame being located adjacent said frame outside the groove therein so as to conceal said retaining member.

4. A window assembly comprising a window panel, a frame surrounding said panel, said frame having a base surface, said frame having an upstanding wall at one side of said base surface and a continuous longitudinal groove intermediate the ends of the frame at the other side of said base surface and below the same, a rubber glazing strip seated upon said base surface adjacent said wall and having a continuous channel receiving the edge of said panel, said glazing strip having at the side remote from said wall an integral buttress portion engaging a face of said panel, said buttress portion having a continuous longitudinal groove formed in the underside thereof, said second mentioned groove being offset outwardly from the plane of said panel and situated wholly below the bottom of said channel, said second mentioned groove being opposed to and in superposed relation with said first mentioned groove, whereby said grooves are enclosed by their walls, and a separate flexible retaining strip removably engaged in said grooves and keying said glazing strip to said frame, said retaining strip exerting an upward compressive force on said buttress portion of the glazing strip and causing it to press laterally upon the face of said panel.

5. A panel assembly comprising a panel, a frame surrounding said panel and having a continuous longitudinal groove formed therein intermediate the ends thereof, a one-piece flexible rubber glazing strip seated in said frame and having a channel formed therein receiving the edge of said panel, said glazing strip also having an outer buttress portion provided with a continuous groove in its underside opposed to and in superposed relation with the groove in said frame, said grooves being laterally offset from said panel and below the bottom of said channel and being enclosed by their walls, and a compressible retaining strip removably engaged within said grooves and adapted to exert an upward pressure on said buttress portion and to cause one side of said channel to press laterally upon a face of said panel over the full depth of said channel side, said glazing strip having a flexible resilient outer flap which can be raised to permit of insertion of the retaining strip and which normally co-operates with said frame so as substantially to conceal said retaining strip.

6. A window assembly comprising a window panel, a frame member having a seating surface and a longitudinal groove adjacent said surface intermediate the ends of the frame member, a one-piece channeled rubber glazing strip seated on said surface and receiving the edge of said panel, said strip having an outer lateral and integral buttress portion provided with a longitudinal groove in its underside offset from the plane of said panel and below the bottom of said channel, said buttress portion being substantially flush with a side of said frame member, said grooves forming an enclosed space, and a separate longitudinal retaining member engaged with said grooves and keying said glazing strip to said frame member, said retaining member compressing said buttress portion against a face of said panel and being concealed by an outer part thereof.

WALTER WILLIAM SMALL.

REFERENCES CITED

The following references are of record in the file of this patent:

UNITED STATES PATENTS

| Number | Name | Date |
| --- | --- | --- |
| 2,056,024 | Stuart | Sept. 29, 1936 |
| 2,205,538 | Owen | June 25, 1940 |
| 2,278,348 | Dutfield | Mar. 31, 1942 |